(12) United States Patent
Kreft

(10) Patent No.: US 9,463,755 B2
(45) Date of Patent: Oct. 11, 2016

(54) LICENSE PLATE MOUNT

(71) Applicant: Paul H. Kreft, Elmhurst, NY (US)

(72) Inventor: Paul H. Kreft, Elmhurst, NY (US)

(*) Notice: Subject to any disclaimer, the term of this patent is extended or adjusted under 35 U.S.C. 154(b) by 156 days.

(21) Appl. No.: 13/655,196

(22) Filed: Oct. 18, 2012

(65) Prior Publication Data

US 2013/0112823 A1    May 9, 2013

Related U.S. Application Data

(63) Continuation-in-part of application No. 12/783,148, filed on May 19, 2010, now abandoned.

(60) Provisional application No. 61/179,568, filed on May 19, 2009.

(51) Int. Cl.
| | | |
|---|---|---|
| B60R 13/10 | (2006.01) | |
| G09F 7/18 | (2006.01) | |
| G09F 3/20 | (2006.01) | |
| G09F 7/00 | (2006.01) | |
| B60R 11/00 | (2006.01) | |
| F16B 11/00 | (2006.01) | |

(52) U.S. Cl.
CPC .......... B60R 13/105 (2013.01); B60R 13/10 (2013.01); G09F 3/203 (2013.01); G09F 7/002 (2013.01); G09F 7/18 (2013.01); B60R 2011/0063 (2013.01); F16B 11/006 (2013.01)

(58) Field of Classification Search
CPC .............. B60R 13/10; B60R 13/105; B60R 2011/0063; G09F 7/18; G09F 3/203; G09F 7/002
USPC .................................................. 40/200, 209
See application file for complete search history.

(56) References Cited

U.S. PATENT DOCUMENTS

| 3,230,653 | A | * | 1/1966 | Rice | 40/591 |
| 3,531,880 | A | * | 10/1970 | Ramee | 40/643 |
| 3,826,026 | A | * | 7/1974 | Bevan | 40/644 |
| 3,841,680 | A | * | 10/1974 | Muller | 293/142 |
| 3,918,187 | A | * | 11/1975 | Vogele | 40/781 |
| 4,268,125 | A | | 5/1981 | Carter | 359/872 |
| 4,736,539 | A | * | 4/1988 | Dickinson | 40/591 |
| 4,756,106 | A | * | 7/1988 | Foster | 40/591 |
| 4,857,890 | A | | 8/1989 | Solow | 340/479 |

(Continued)

FOREIGN PATENT DOCUMENTS

| GB | 2150727 | A | * | 7/1985 | ............ G09F 7/18 |
| GB | 2380308 | A | * | 4/2003 | ............ G09F 7/16 |

(Continued)

OTHER PUBLICATIONS

Avery Dennison FT 1158, Transfer Tape, Spec # 56385, Product Description and Product Data, *Avery Dennison Specialty Tape Division Product Information Bulletin*.

(Continued)

*Primary Examiner* — Eret McNichols
(74) *Attorney, Agent, or Firm* — Ostrolenk Faber LLP

(57) ABSTRACT

A license plate mount arrangement that includes a flexible and compliant license plate mount having an adhesive backing on the back surface thereof and a plurality of couplings accessible at the front surface thereof, the arrangement allowing for the mounting of a license plate to an exterior surface of a vehicle without drilling mounting holes in, or otherwise modifying the exterior surface of the vehicle.

13 Claims, 14 Drawing Sheets

(56) References Cited

U.S. PATENT DOCUMENTS

| | | | | |
|---|---|---|---|---|
| 4,891,895 | A | 1/1990 | DeLaquil | 40/209 |
| 4,955,153 | A * | 9/1990 | Albrecht et al. | 40/661 |
| 5,077,925 | A * | 1/1992 | Herrera et al. | 40/642.02 |
| 5,078,537 | A | 1/1992 | Nomura | 411/84 |
| 5,771,619 | A * | 6/1998 | Wells | 40/643 |
| 5,819,449 | A * | 10/1998 | Molson | 40/200 |
| 6,167,645 | B1 * | 1/2001 | Gasko et al. | 40/200 |
| 6,760,986 | B1 * | 7/2004 | MacNeil | 40/200 |
| 6,892,483 | B2 | 5/2005 | Parenti | 40/201 |
| 6,912,805 | B2 * | 7/2005 | Ngan | 40/642.02 |
| 7,083,211 | B1 * | 8/2006 | Bores | 296/1.08 |
| 2002/0085896 | A1 | 7/2002 | Werner et al. | 411/366.1 |
| 2004/0135383 | A1 * | 7/2004 | Ariga et al. | 293/117 |
| 2004/0187371 | A1 | 9/2004 | Maqui et al. | 40/591 |
| 2004/0214477 | A1 | 10/2004 | Ikeda | 439/709 |
| 2004/0244240 | A1 * | 12/2004 | Yen | 40/209 |
| 2005/0210721 | A1 * | 9/2005 | Blackburn | 40/209 |
| 2007/0227416 | A1 | 10/2007 | Wang | 108/161 |
| 2007/0251814 | A1 | 11/2007 | Beele et al. | 204/192.1 |
| 2007/0257166 | A1 | 11/2007 | Christopherson | |
| 2008/0098629 | A1 * | 5/2008 | Graham et al. | 40/201 |
| 2010/0239791 | A1 | 9/2010 | Douglas | 428/31 |
| 2010/0330322 | A1 * | 12/2010 | Goodrich et al. | 428/42.1 |
| 2011/0283574 | A1 * | 11/2011 | Ellman et al. | 40/209 |

FOREIGN PATENT DOCUMENTS

| | | | |
|---|---|---|---|
| GB | 2417596 A | * | 3/2006 |
| GB | 2435344 A | * | 8/2007 |

OTHER PUBLICATIONS

Technical Data Sheet (Appendix) for A2003CT, pinta Material Designation, pinta foamtec.

"Push Lock Screws Large Head", *Popco Inc.*, Date of Access: Oct. 18, 2012, <http://www.popco-usa.com/products/push-lock-screws-large-head.com>.

* cited by examiner

Fig. 5A    Fig. 5B
 
Stainless Steel Button Head Socket Pin Screw
1/4" - 20 x 3/8"
Fig. 6A    Fig. 6B
 
Square Black Nylon Nuts
5/8" x 5/8" x 3/8"

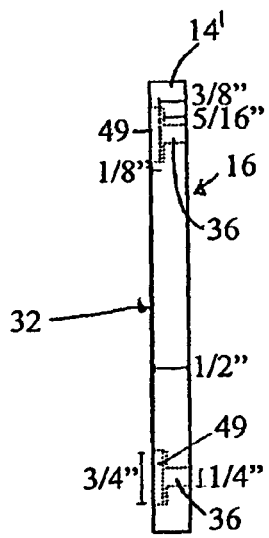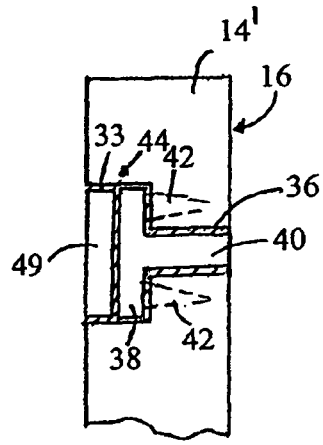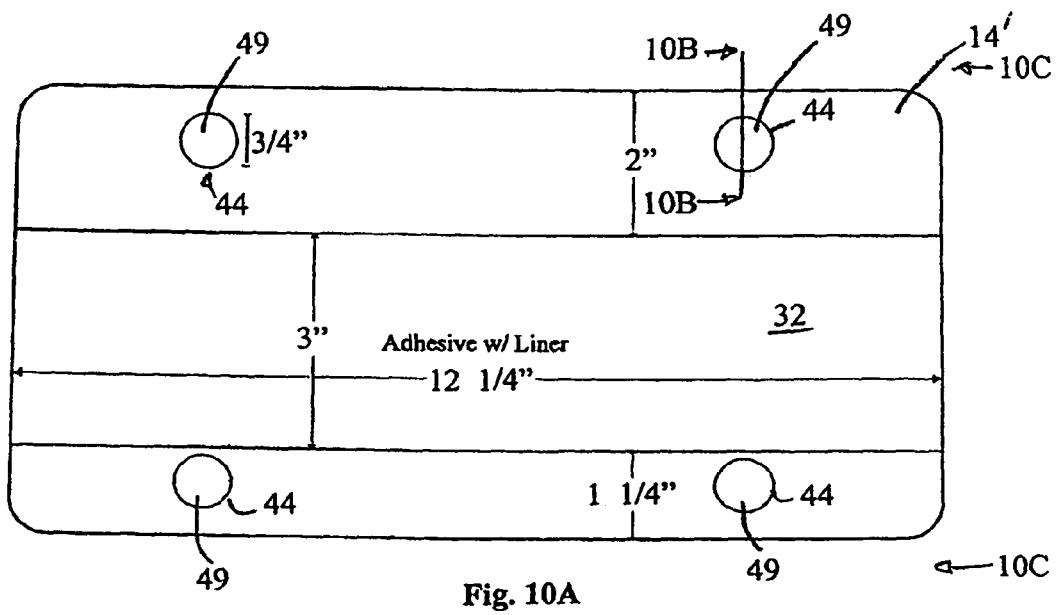
Fig. 10C
Fig. 10B
Fig. 10A

LICENSE PLATE MOUNT

CROSS REFERENCE TO RELATED APPLICATION

The present application is a continuation in part of U.S. patent application Ser. No. 12/783,148, filed May 19, 2010, which claims benefit of U.S. Provisional Application Ser. No. 61/179,568, filed May 19, 2009. The entire disclosures of both applications are hereby incorporated by reference.

BACKGROUND OF THE INVENTION

In the United States, and indeed in most foreign countries, the display of a license plate is required. Currently, the majority of the states (31 out of 50) require the display of a license plate on the back of the vehicle as well as the front of the vehicle. Typically, the license plate is mounted to the bumper of the car where it can be readily seen so that the vehicle and the registrant thereof can be identified.

In the United States, a license plate is typically a rectangular metallic plate (e.g. a steel plate) that includes a series of numbers and/or letters serving as the identification for the registrant of the vehicle. To mount the license plate, mounting holes are provided near the corners thereof. According to a conventional method, screws or the like are used to mount the license plate onto a surface of a bumper or some other surface of a vehicle. To be more specific, to mount a license plate, holes, that register with the mounting holes of the license plate, may be drilled into the body on which the license plate is to be mounted. For example, holes that register with the mounting holes of the license plate are drilled into a front or a back bumper of the vehicle. Consequently, the conventional mounting procedure requires modification (i.e. damaging) of the vehicle, which is an undesirable result.

To avoid modification of the vehicle, mounting apparatus using suction cups or the like have been proposed. However, such arrangements lack adequate coupling capability, and, therefore, are unreliable for the purpose of mounting a license plate to a surface on the outside of a car.

It is, therefore, desirable to have a license plate mounting that does not require the modification of the body to which it is mounted, and, does not suffer from the drawbacks of other known arrangements.

SUMMARY OF THE INVENTION

A license plate mount according to the present invention allows for the mounting of a license plate to an exterior surface of a vehicle, e.g. the front bumper, without the modification thereof. Specifically, a license plate mount according to the present invention is a compliant body that is adhesively mounted to the exterior surface of a portion of a body of a vehicle, such as, the front bumper or the back bumper of a car. The adhesive used for mounting the license plate mount is compatible with the license plate mount as well as compatible with the body to which the license plate mount is adhered. Thus, the adhesive adheres well to both the license plate mount and the surface to which the license plate mount is mounted, does not cause chemical or mechanical damage to either body, is weather resistant, and is releasable to allow the removal of the license plate mount without causing damage to the surface of the vehicle. For example, a suitable remover can be used to cause the release of the adhesive without causing damage to the surface of the vehicle.

According to another aspect of the present invention, the license plate mount is comprised of a material, which is weather resistant, resistant to damage caused by ozone or UV rays, resistant to damage by road salts or salty air, resistant to damage caused by oil and gasoline, resistant to tearing and also degradation due to exposure to external elements after a long and continuous period of outdoor use.

Furthermore, according to another aspect of the present invention, the license plate mount is comprised of a compliant material, e.g. a compliant polymer, such that, when adhesively mounted, the body of the license plate mount deforms to follow the contour of the surface to which the license plate mount is attached. The deformation, however, does not result in significant deformation of the surface to which the license plate is mounted. As a result, the license plate would remain mounted to a relatively flat surface, whereby unnecessary stresses caused by the deformation of the license plate mount may be avoided, which improves the reliability of the license plate mount.

It has been found by the inventor that a suitable material for forming the license plate mount is a spongy polymer called EPDM.

Other features and advantages of the present invention will become apparent from the following description of the invention which refers to the accompanying drawings.

BRIEF DESCRIPTION OF THE FIGURES

FIG. 5A shows a side view of a screw suitable for use with a license plate mount according to the present invention.

FIG. 5B shows a top plan view of the screw shown by FIG. 5A.

FIG. 6A shows a side view of a nut suitable for use in an assembly according to the present invention.

FIG. 6B shows a front plan view of the nut shown by FIG. 6A.

FIG. 10A shows a back plan view of a fourth embodiment of an arrangement according to the present invention.

FIG. 10B illustrates a cross-sectional view of a portion of the fourth embodiment viewed along line 2B-2B in the direction of the arrows.

FIG. 10C is a side plan view of the fourth embodiment viewed in the direction of arrows 10C.

Figure 1:
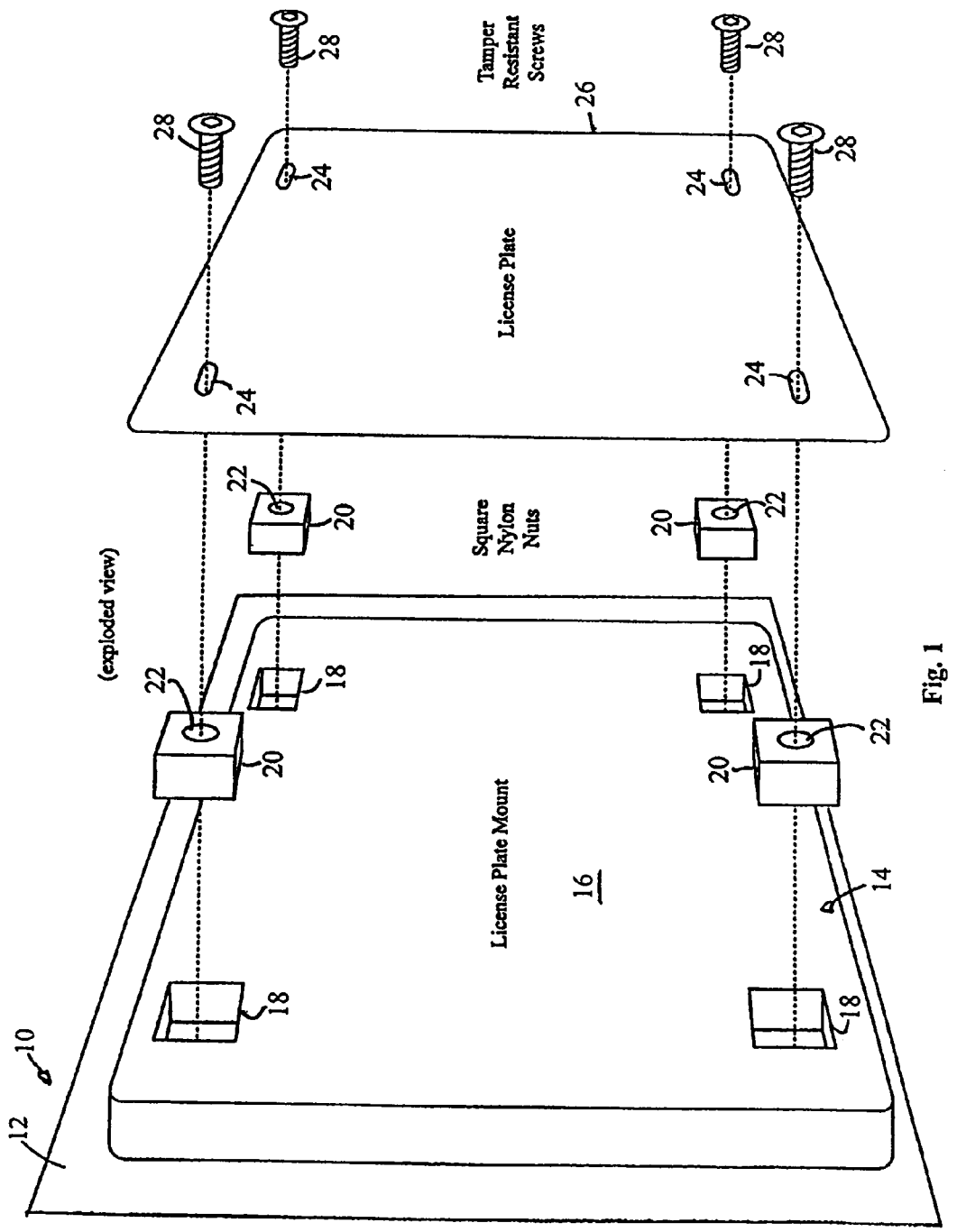
FIG. 1 illustrates an exploded view of a license plate assembly according to the present invention.

All broken lines in the figures indicate an outline of a body residing within another body.

DETAILED DESCRIPTION

Referring to FIG. 1 and FIGS. 2A-2C, an assembly using a license plate mount according to the present invention includes a body 10 (e.g. a front or back bumper of a vehicle) having an exterior surface 12, a license plate mount 14 that is adhesively attached to exterior surface 12 at a back surface thereof. License plate mount 14 is a generally flat body that includes a plurality of depressions/recesses 18, a front surface 16 opposite to its back surface 34 (illustrated in FIG. 2C). Note that front surface 16 and back surface 34 are generally flat and parallel to one another in an unmounted state. Back surface 34, however, can conform to the contour of the surface to which it is adhesively attached. Depressions/recesses 18 preferably do not extend through the body of license plate mount 14, but extend partially through the body of license plate mount 14 to realize blind holes that serve as cradles each for receiving a respective nut 20. Each nut 20 may be formed with nylon or any other suitable material and may include peripheral edges arranged in a geometric shape such as a square as shown, or hexagonal or the like. Incidentally, preferably, each depression/recess 18 may have a flat bottom and walls that are arranged to have the same geometric shape as the shape of the peripheral edges of the nut that is received therein. Furthermore, each depression/recess 18 may have a depth that is the same or nearly the same as the thickness of the nut which is received therein so that the license plate may be flush-mounted on front surface 16 of license plate mount 14. Thus, for example, when a nut 20 having a square peripheral boundary is used, the recess in which it is received will have walls arranged in a square of nearly the same dimensions as the nut and will have a depth that is nearly the same or the same as the thickness of the nut, whereby the nut will not extend further than front surface 16. Preferably, each nut 20 will be flush with front surface 16 of license plate mount 14.

According to the preferred embodiment, nut 20, once received in a respective recess 18, is further secured to license plate mount 14 by an appropriate amount of a suitable adhesive 30 such as a weather resistant glue. It should be noted that each nut 20 includes a threaded opening 22 which is preferably centrally located relative to the corners thereof. The threads of the threaded opening correspond to threads of screws used for mounting a license plate onto front surface 16 of license plate mount 14. Thus, nuts 20 serve as couplings to connect a license plate to a license plate mount 14.

Figure 3:
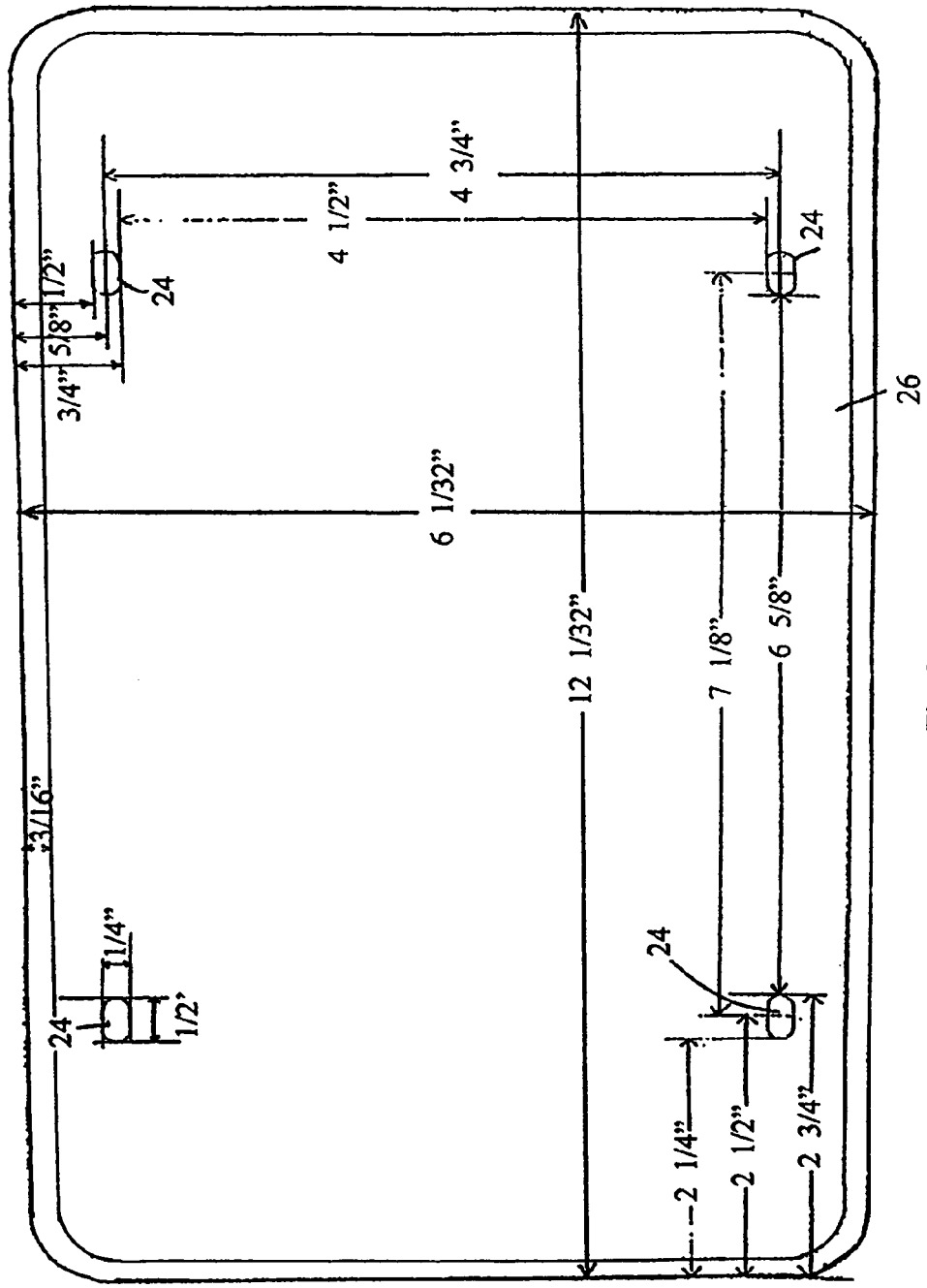
FIG. 3 illustrates a front plan view of a standard license plate and the relevant standard dimensions for a standard license plate conventionally used in the United States.

Recesses 18 are arranged so that once nuts 20 are received therein openings 22 in nuts 20 are arranged to register with mounting holes 24 of license plate 26. License plate 26 may be a conventional license plate with conventional dimensions in which the mounting holes may be spaced according to a known standard. FIG. 3 illustrates a front plan view of a standard license plate and includes standard dimensions used in the U.S. Thus, for example, according to one known standard, mounting holes 24 may be located at corners of a rectangle having a length of 7⅛" and a width of 4¾". Consequently, openings 22 may be arranged so that the centers thereof will be located at the corners of an imaginary rectangle having a length of 7⅛" and a width of 4¾".

It should be noted that a license plate mount 14 is not limited for use with a standard U.S. license plate, but may be used with any license plate by selecting the distance between nuts 20 so that the openings 22 therein register with mounting holes 24 of the license plate. The following are standard dimensions for license plates in different jurisdictions:

12 by 6 inches (300 mm by 150 mm)—Used in the majority of the Americas.

20.5 by 4.5 inches (520 mm by either 110 or 120 mm)—Used in the bulk of the European countries and many of their former overseas territories.

14.5 by 5.3 inches (372 mm by 135 mm)—Used in Australia and some other Pacific Rim countries, about halfway between the dimensions of the other two standards, longer than Western Hemisphere plates but taller than European ones.

An assembly according to the present invention preferably includes threaded screws 28. Each screw 28 is threaded to be threadably coupled to a respective opening 22 of a respective nut 20.

While screws 28 may be of any variety including a flat head screw or a phillips head screw, it is preferred to mount license plate 28 to license plate mount 24 using hex head screws as illustrated by FIGS. 5A and 5B. It is most preferred to use tamper-resistant screws called security screws. There are several different types of security screws. A preferred security screw for use in an assembly according to the present invention includes a pin inside a hexagonal socket head. A hexagonal socket head with a pin requires a special (uncommon) hexagonal driver with a hole in it, thus creating an increased level of security. The use of security screws enhances the security of the license plate 26 mounted to license plate mount 14 of the present invention. Screws 28 may be made from stainless steel or any suitable material. Stainless steel is preferred because it not only increases aesthetic value, but also increases the life-span of the product as a whole by resisting outdoor elements better than cheaper materials. Stainless steel is not the only material that can do this however. Note that, while screws are used in one preferred embodiment, any other type of fastener may be used (e.g. clips or bands) without deviating from the scope and the spirit of the invention.

Figure 2A:
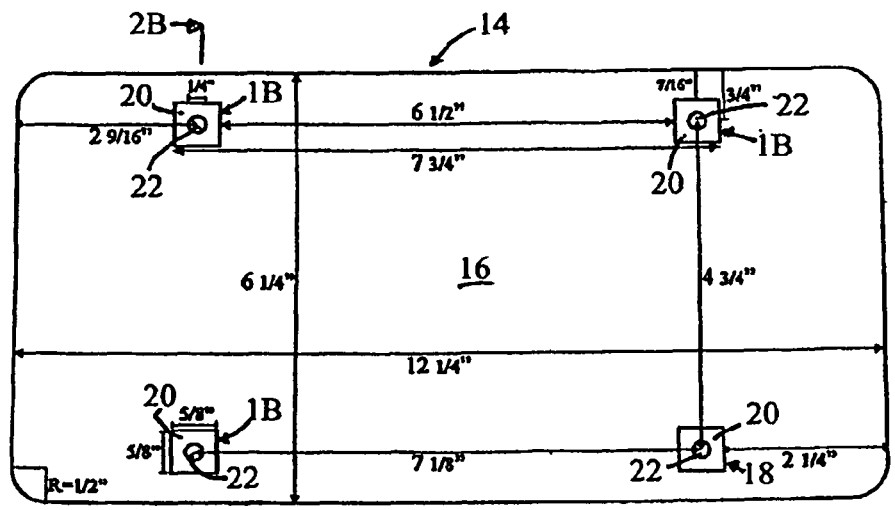
FIG. 2A illustrates a plan view of a front surface of a license plate mount according to the present invention.

FIG. 2A shows a front plan view of a license plate mount 14 having nuts 20 mounted in recesses 18 thereof. FIG. 2B shows a cross-sectional view of license plate mount 14 along line 2B-2B viewed in the direction of the arrows. Note that the dimensions shown in FIGS. 2A and 2B are for a preferred embodiment, but are not to be understood to be critical or limiting. Further note that preferably license plate mount 14 is a generally rectangular body having a front surface 16 which is at least large enough to accommodate nuts 20 for receiving a conventional license plate, but may be, preferably, large enough to have a front surface 16 that is larger than a conventional license plate (FIG. 3). Preferably, license plate mount 14 includes rounded corners.

Referring now to FIG. 2B, as mentioned earlier nuts 20 may be attached to the interior surfaces of depressions 18 by an adhesive 30.

Figure 2C:
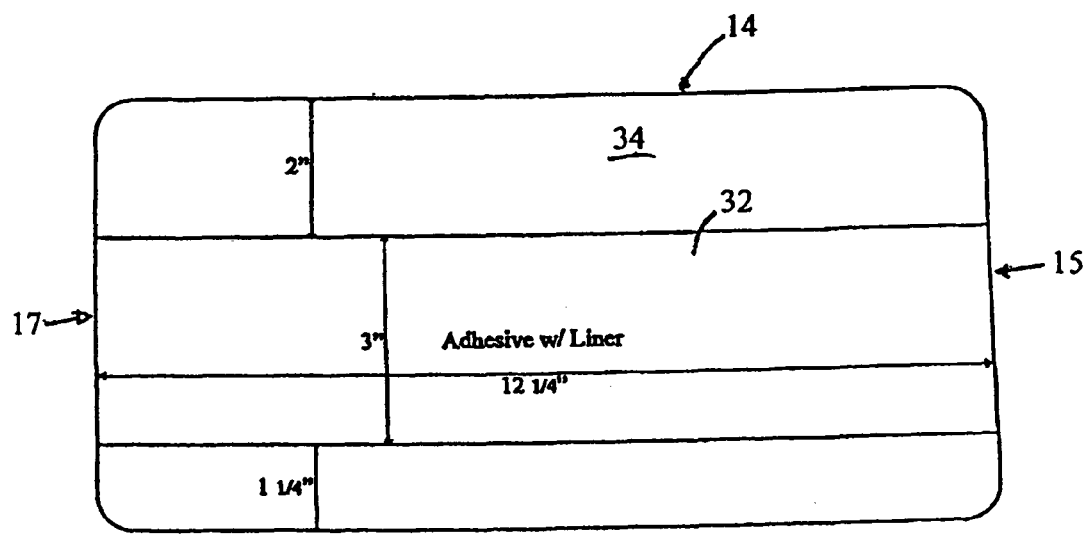
FIG. 2C illustrates a plan view of a back surface of a license plate mount according to the present invention.
Figure 2B:
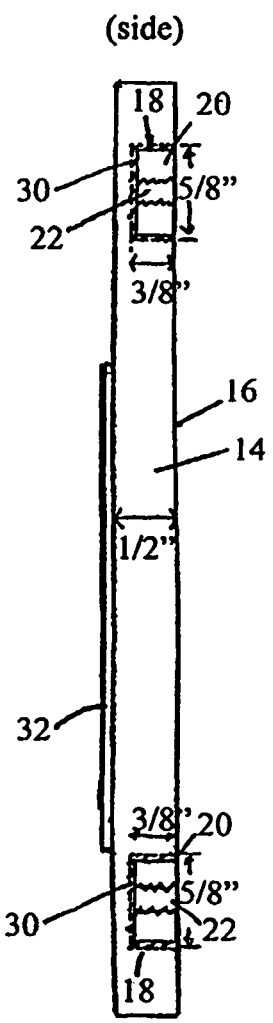
FIG. 2B illustrates a cross-sectional view along line 2B-2B viewed in the direction of the arrows.

Referring now to FIGS. 2B and 2C, according to another aspect of the present invention, at least one lined adhesive strip 32 is disposed on the back surface 34 of license plate mount 14. Adhesive strip 32 preferably extends along the length of license plate mount 14 from one edge 15 to another opposing edge 17 thereof, and is comprised of any pressure-sensitive adhesive compatible with the material used to form license plate mount 14 and the surface on which license plate mount 14 is to be mounted. Note that adhesive strip 32 is positioned such that the central longitudinal axis thereof (i.e. the axis that is equally spaced from its longest opposing edges) is offset from (i.e. does not coincide with) the central longitudinal axis of license plate mount, which extends from the center of one edge 15 to the center of another edge 17.

According to an aspect of the present invention, license plate mount 14 is a unitary (single piece) body made from a compliant polymer which is weather resistant, resistant to damage caused by ozone or UV rays, resistant to damage by road salts or salty air, resistant to damage caused by oil and gasoline, resistant to tearing and also degradation due to exposure to external elements after a long and continuous period of outdoor use.

Figure 4:
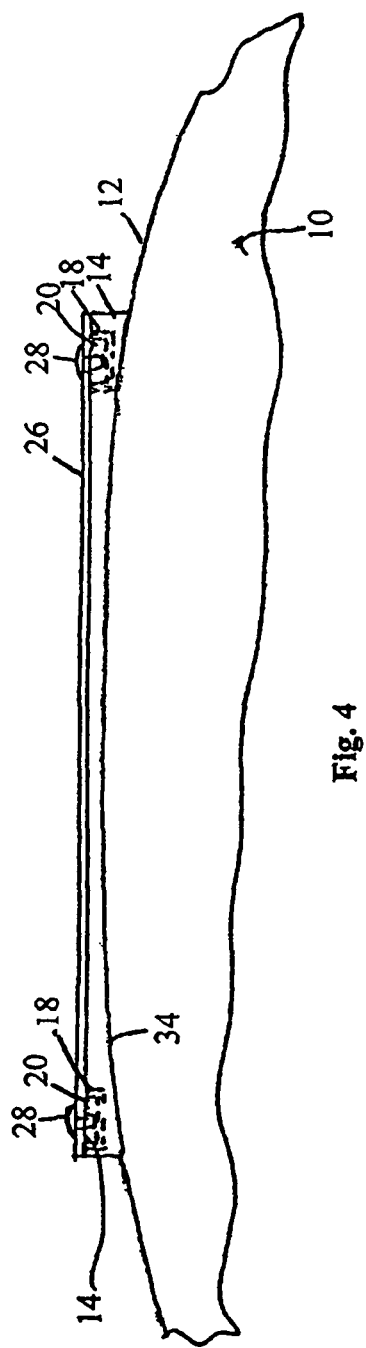
FIG. 4 illustrates a top plan view of a license plate mounted to an exterior surface using a license plate mount according to the present invention.

It has been determined by the inventor that a suitable material for forming a license plate mount 14 is EPDM, which stands for ethylene propylene diene M-class rubber (also referred to as EPDM foam rubber). EPDM is suitable in that its foam-like constitution can be adjusted to obtain a compliant and spongy polymer. For example, a hardness of about 40-50 (+/−5) on the Shore 00 Durometer scale is suitable for forming a license plate mount according to the present invention. Note that the hardness value can vary, although the hardness value noted herein is preferred. Preferably, a license plate mount 14 according to the present invention is formed with 100% EPDM or a premium blend of EPDM. The compliance of a license plate mount 14 according to the present invention should be selected such that, when adhesively mounted as illustrated by FIG. 4, the body of license plate mount 14 deforms to follow the contour of the surface 12 to which license plate mount 14 is attached. The deformation, however, does not result in significant deformation of front surface 16 to which license plate 26 is mounted. As a result, license plate 26 would remain mounted to a relatively flat surface, whereby unnecessary stresses caused by the deformation of the license plate mount 14 may be avoided, which improves the reliability of the license plate mount. It should be noted that the compliant nature of license plate mount 14 can further protect the bumper of the vehicle from minor collisions.

Suitable adhesives for use with adhesive strip 32 which have shown good adhesion to EPDM <-> automotive clear coat and/or EPDM <-> nylon are listed below:

SS67A (sold by Silicone Solutions)
SS301A (sold by Silicone Solutions)
SS303 (sold by Silicone Solutions)
5944M (sold by Adchem Corporation)
A2003CT (Pinta Foamtec)
EverGuard (Roofing Adhesive)

Note that some adhesives are actually an ultra thin film (used as a coupler with common characteristics) sandwiches between two different adhesives. This effectively creates one adhesive strip with two distinct sets of adhesive properties.

Specifically, the adhesives sold by Silicone Solutions are most suitable for bonding nylon nuts to EPDM, while 5944M is an adhesive arrangement most suitable to bond an EPDM body to a car's clear coat. Generally speaking, a suitable adhesive arrangement for the preferred embodiment should adhere well to EPDM and also adhere well to but be removable from the finish of the exterior of the car without causing any damage to the same. 5944M is suitable for attaching license plate mount 14 to an exterior surface of a vehicle in that it includes a flexible body (e.g. a strip of flexible material) having one adhesive that adheres well and can be removed from a clear coat exterior finish of the car, and another adhesive on an opposite surface of the flexible body that adheres well to EPDM. A suitable adhesive for attachment to EPDM, which is a foamy, spongy rubber product, is A2003CT (information available from Pinta Foamtec, Minneapolis, Minn.). Another suitable adhesive for use as strip 32 is available from Avery Dennison (Painesville, Ohio) under the description FT 1158, Spec. #56385.

Figure 7A:
FIG. 7A shows a bottom plan view of a four-prong T-nut.
Figure 7B:
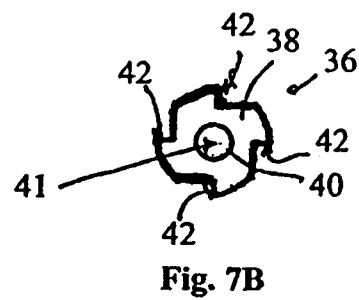
FIG. 7B shows a top plan view of a four-prong T-nut.
Figure 7C:
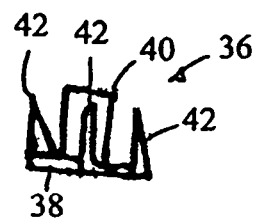
FIG. 7C shows a side plan view of a four-prong T-nut.

In another embodiment of the present invention, each nut 20 may be replaced with a multi-prong T-nut, for example, a four-prong T-nut, to serve as a coupling. Referring to FIGS. 7A-7C, a typical four-prong T-nut 36 includes a base portion 38, cylindrical nut 40 having a threaded axial opening 41 for receiving a screw extending away from and a direction normal to base 38, and four prongs 42 extending from and normal to base portion 38. Each four-prong T-nut 36 may be made from a metal (e.g. stainless steel) or any other suitable material.

Figure 8A:
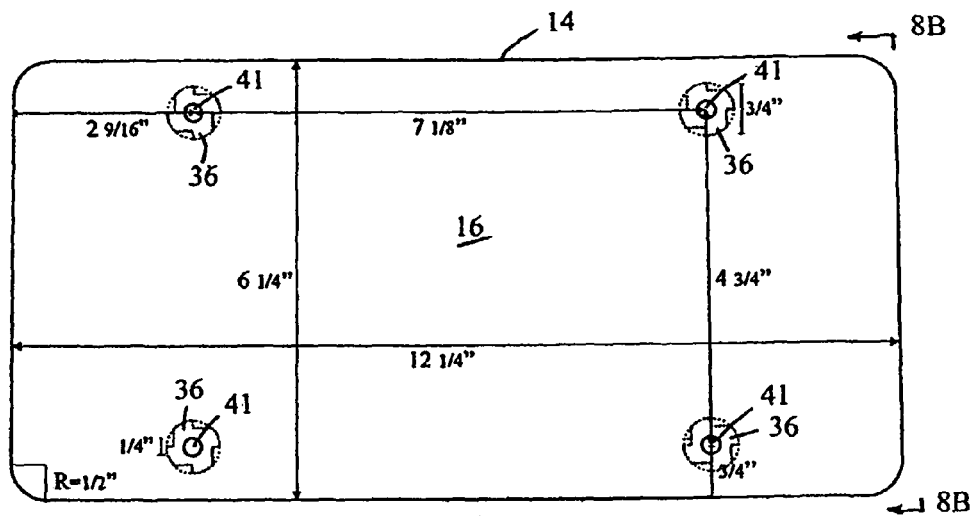
FIG. 8A shows a front plan view of a license plate mount according to a second embodiment of the present invention.
Figure 8C:
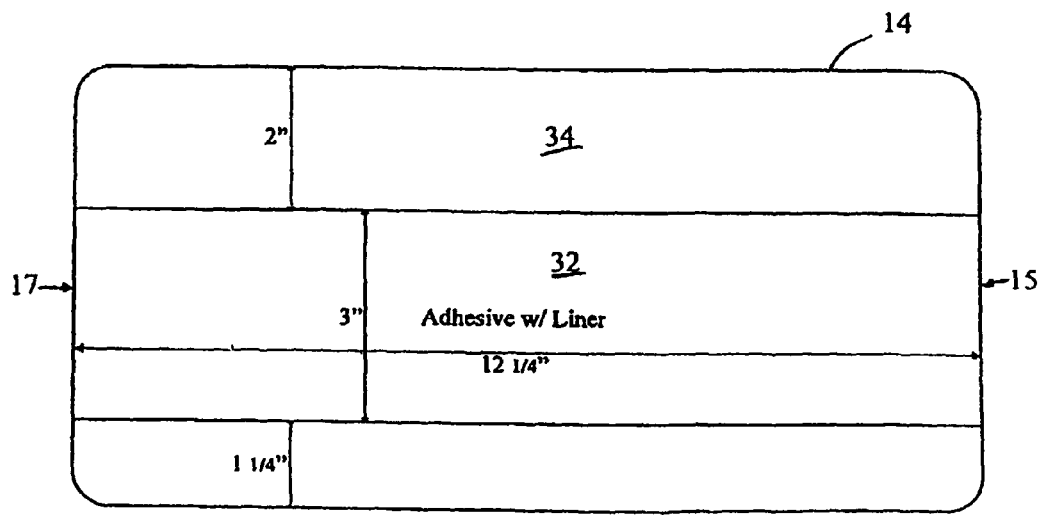
FIG. 8C shows a back plan view of a license plate mount according to the second embodiment of the present invention.
Figure 8B:
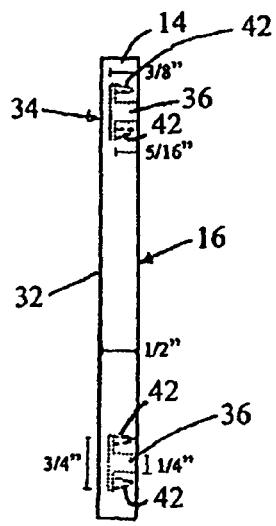
FIG. 8B shows a side plan view of a license plate mount viewed in the direction of arrows 8B in FIG. 8A.

Referring now to FIGS. 8A-8C, in which like numerals identifying like features, in a second embodiment of the present invention, four four-prong T-nuts 36 may be embedded in the body of a license plate mount 14. Thus, for example, an EPDM or the like material may be injection molded around four four-prong T-nuts 36, whereby the T-nuts may be secured in place without an adhesive. Note that in this embodiment, prongs 42 of each nut 36 help prevent the axial rotation thereof thus contributing to the robustness of the assembly. Further note that preferably the open end of each nut 40 does not extend beyond front surface 16 of license plate mount 14, and may be flush with front surface 16 in the most preferred embodiment.

Figure 9B:
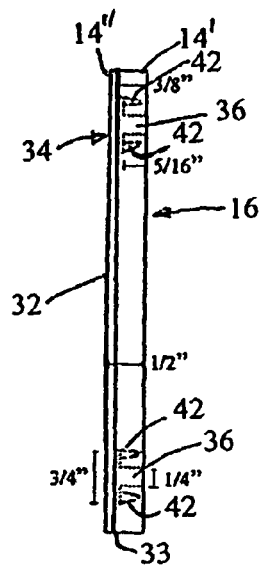
FIG. 9B shows a side plan view of a license plate mount viewed in the direction of arrows 9B in FIG. 9A.
Figure 9A:
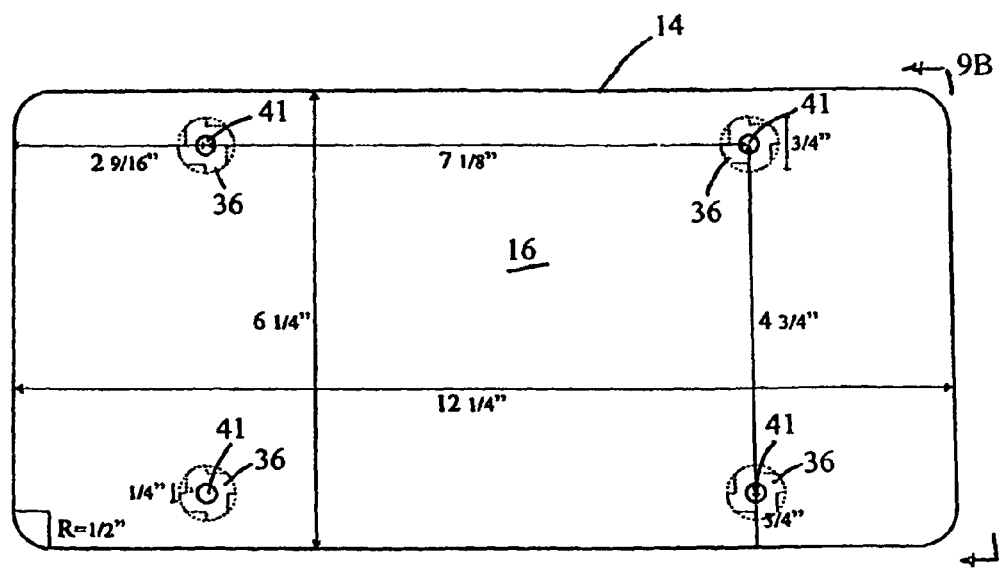
FIG. 9A shows a front plan view of a license plate mount according to a third embodiment of the present invention.
Figure 9C:
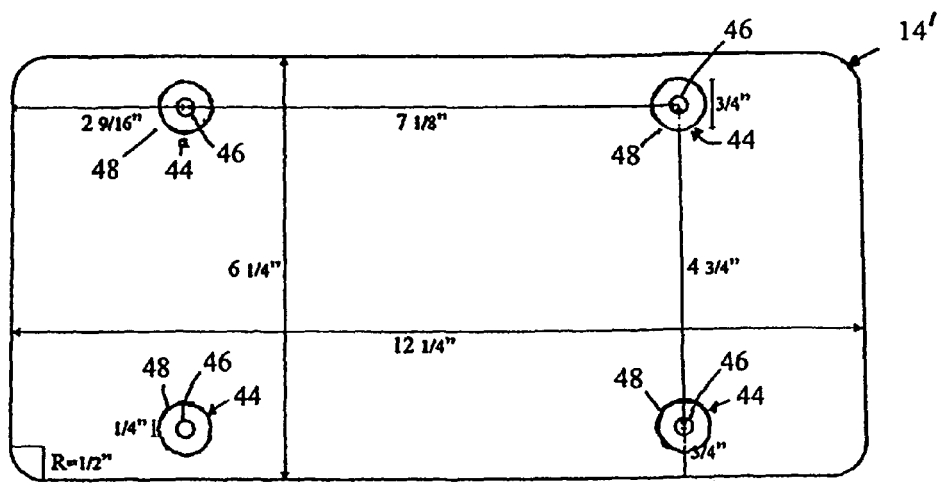
FIG. 9C shows a back plan view of a first portion of a license plate mount according to the third embodiment of the present invention.
Figure 9D:
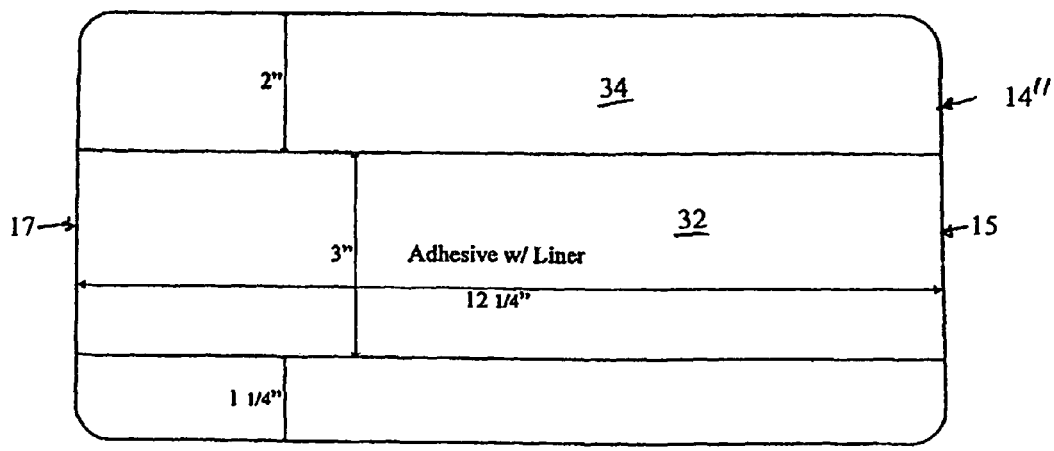
FIG. 9D shows a back plan view of a license plate mount according to the third embodiment of the present invention.

While in the first and the second embodiments license plate mount 14 is a unitary, single piece body, it may be possible to use two different bodies to form a license plate mount 14 without deviating from the scope and the spirit of the present invention. Thus, referring to FIGS. 9A-9C, in which like numerals identify like features, license plate mount 14 may include a first piece 14' and a second piece 14". First piece 14' and second piece 14" are preferably coextensive, i.e. have identical peripheral edges, and may be obtained by cutting a flat piece of, for example, EPDM, in a direction parallel to its front and back faces. Thus, first piece 14' includes front surface 16 and second piece 14" includes back surface 34 when the two pieces are assembled as set forth below. First piece 14' may be then provided with a plurality of openings 44 each for receiving a respective multi-prong T-nut 36 as described above. Note that each opening 44 includes an interior opening 46 which is large enough in diameter and depth to fully receive the nut portion 20 of a respective T-nut 36, and an outside opening 48 having a larger diameter than its interior opening 46 and preferably large enough to receive base portion 38 of a T-nut 36 as described above. Note that preferably the depth of each interior opening 46 is about the height of a nut portion 40 and the depth of each outside opening 48 is about the thickness of base portion 38 of T-nut 36. Thus, when a T-nut 36 is received in a respective opening 44, the top of its nut 40 will be flush with one face of first piece 14' (and eventually flush with front surface 16 of mount 14) and the back of its base 38 flush with the back surface of first piece 14'. Note that in this embodiment, prongs 42 of each T-nut 36 penetrate the area surrounding each interior opening 46 upon receipt in opening 44 whereby each T-nut 36 is anchored to first piece 14'. Thereafter, second piece 14" is coupled to the back of first piece 14'. Preferably, second piece 14" is adhesively attached to the back of first piece 14' by an appropriate glue 33 or the like. Note that instead of a nut, a screw or the equivalent of a screw may be used as a coupling without deviating from the scope and spirit of the present invention.

Referring to FIGS. 10A, 10B and 10C, in an alternative embodiment, instead of using a single second piece 14" that is coextensive with first piece 14', a plurality of EPDM plugs may be used to finish the back of each coupler. Specifically, base portion 38 of each T-nut 36 may be recessed inside each outside opening 48 by about the thickness of a respective plug 49. Thus, once a plug 49 is glued to the back of the base portion 38 of a T-nut 36, the plug 36 will be flush with the back of first piece 14'. For example, the T-nut 36 may be recessed to provide a ⅛ deep clearance, which is then filled with a ⅛ EPDM (or some other) plug 49. Note that, for extra mechanical integrity, T-nut 36 may be glued to the interior of opening 48 inside mount 14.

Figure 11:
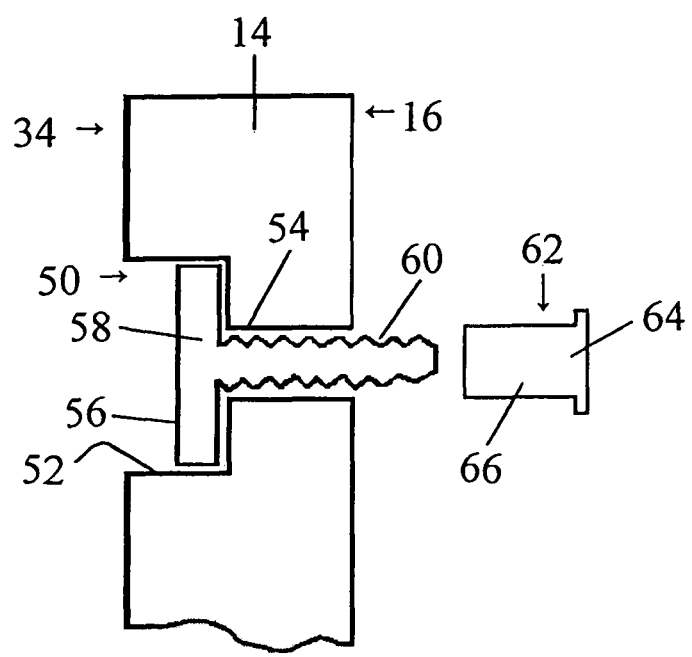
FIG. 11 illustrates a license plate mount configured for receiving another type of license plate coupler.
Figure 12A:
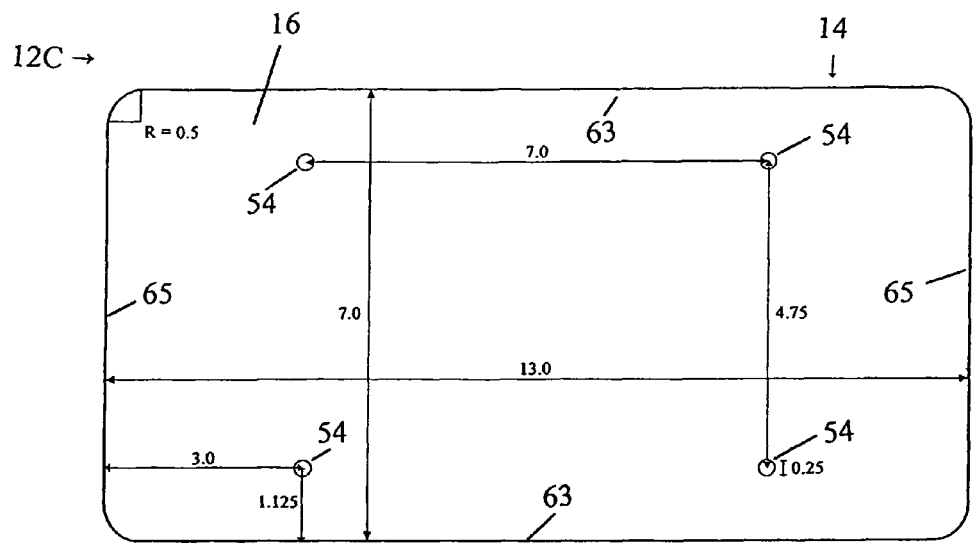
FIG. 12A shows a front plan view of a license plate mount according to the fifth embodiment.
Figure 12B:
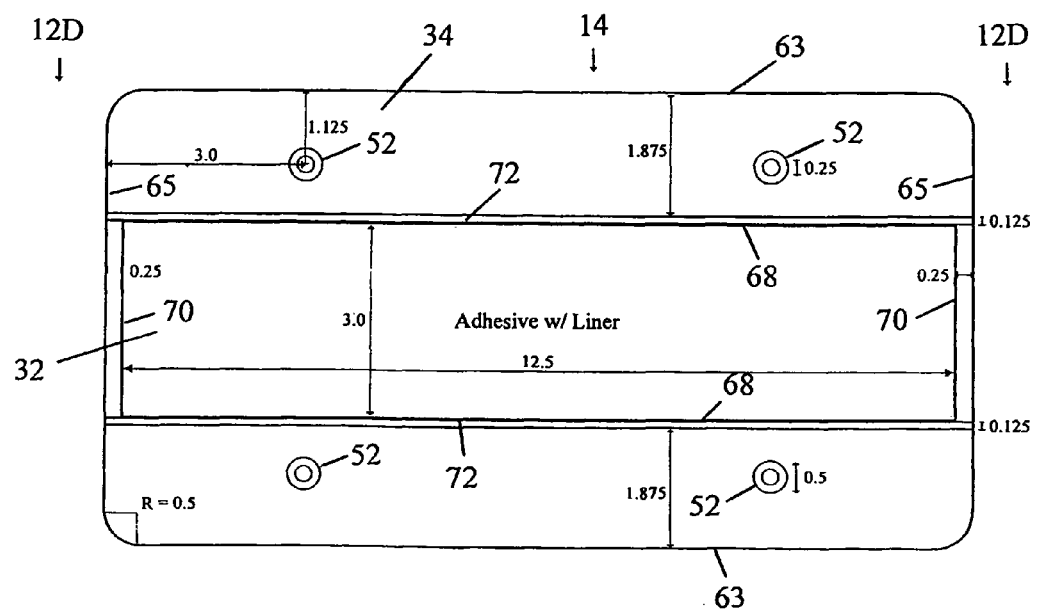
FIG. 12B shows a back plan view of a license plate mount according to the fifth embodiment.
Figure 12D:
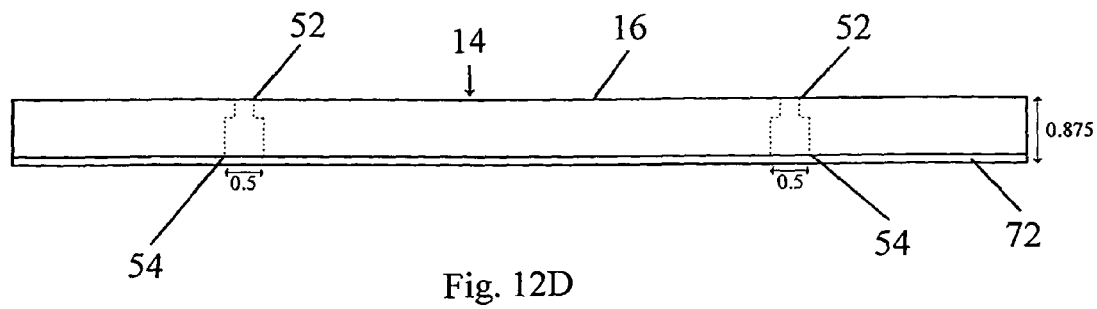
FIG. 12D shows a top plan view of a license plate mount according to the fifth embodiment viewed in the direction of arrows 12D in FIG. 12B.
Figure 12C:
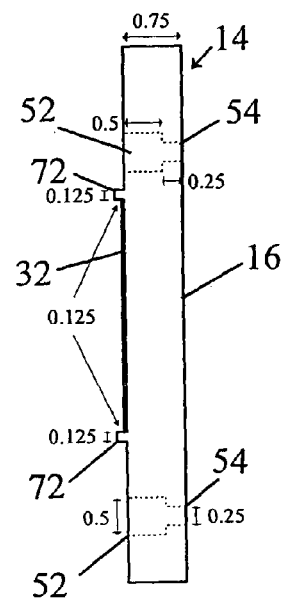
FIG. 12C shows a side plan view of a license plate mount according to the fifth embodiment viewed in the direction of arrows 12C in FIG. 12A.

A license plate mount 14 according to the present invention may be configured to receive another kind of coupler for coupling a license plate to the license plate mount 14. A suitable coupler may be a fastener called push-lock screw, available, for example, from Popco Inc. Push-lock screws are usually used in book binding. Push-lock screws are designed for rapid coupling without a tool by pushing two coupling pieces together. After the two pieces couple, they can be decoupled by unscrewing one from the other. As illustrated in FIG. 11, an opening 50 may be defined in license plate mount 14 extending from back surface 34 to front surface 16 thereof. Opening 50 may have a first cylindrical section 52 having a mouth at back surface 34 and terminating inside the body of license mount 14 at a second cylindrical portion 54. Second cylindrical portion 54 extends from first cylindrical portion 52 to front surface 16. Opening 50 is preferably sized to receive a screw 56 (a first part of a push-lock screw) having a base 58 with a diameter that is narrower than the diameter of the base of first cylindrical section 52, but wider than the diameter of the base of second cylindrical portion 54. Screw 56 includes a threaded screw section 60 which is preferably at least long enough to extend beyond front surface 16 when base 58 is fully received inside first cylindrical section 52 as illustrated. A nut 62 (the second part of a push-lock screw) having a base 64 and a nut section 66 can be used to mount a license plate to license plate mount 14. Specifically, nut section 66, which does not have a threaded interior surface, snaps onto screw section 60 after a license plate is temporarily mounted onto (hung on) screw sections 60, which preferably extend out of opening 50. To disassemble the two pieces, nut 62 is unscrewed from screw section 60. Thus, a push-lock screw allows for fast assembly of a license plate without tools.

Referring to FIGS. 12A-12D, a license plate mount 14 according to the fifth embodiment of the present invention is configured to include an opening 50 as described above for receiving a screw 56 of a push-lock screw. A skilled person, however, should recognize that a license plate mount 14 as shown in FIGS. 12A-12D may be configured to receive any other suitable coupler, including other couplers described herein, without diverting from the present invention. It should be noted that the arrangement shown in FIG. 11 is preferred because it allows screw 56 to move relative to license plate mount 14. That is, screw 56 is not integrated with or anchored into the body of license plate mount 14. Moreover, advantageously, screw 56 and nut 66 can be joined quickly and without a tool.

A license plate mount 14 according to the fifth embodiment includes an adhesive strip 32 extending preferably parallel to the length-wise edges 63 of license plate mount 14 and resides between the width-wise edges 65 of license plate mount 14. Adhesive strip 32 may be a single strip having two parallel length-wise edges 68 and two parallel width-wise edges 70. Each edge 70 faces but is spaced from a respective width-wise edge 65. The purpose of the spacing is to prevent the edges of adhesive strip 32 from adhesively trapping particles between the license plate mount 14 and the surface to which it is attached (e.g. bumper of a car). It has been found that once such particles are trapped vibrations or the like cause damage to the car's finish.

According to another aspect of the present invention, two preferably parallel ridges 72 are defined to extend from back surface 34 of license plate mount 14. Ridges 72 are preferably parallel to one another and both extend from one width-wise edge 65 to the other opposite width-wise edge 65 thereby spanning at least the entire length of edges 68 of adhesive 32. As illustrated adhesive strip 32 resides between ridges 72. Each ridge 72 is spaced from both length-wise edges 63 and is defined to be thicker than adhesive strip 32 (see FIG. 12C). Once license plate mount 14 is installed, ridges 72 prevent particles from adhering to edges 68 of adhesive strip 32 to prevent damage to the car's finish. Thus, each ridge 72 resides between an edge 63 and an edge 68 and functions as a particle guard. Consequently, in a license plate mount according to the fifth embodiment, adhesive strip 32 is confined within edges 63, 65 of license plate mount 14.

The numeral values shown in FIGS. 12A-12D are in inches and are provided for illustrative purposes. The values should not be understood to be limiting.

A preferred material for making license plate mount 14 as illustrated in FIGS. 12A-12D may be Neoprene/EPDM/SBR (e.g. Rubber lite F-5013). A suitable adhesive may be 3M 9453LE (3.5 mil). It has been found that if the material for making the license plate mount 14 is subjected to heating for at least 24 hours or any suitable time/temperature combination to degas the material, undesirable changes in the dimensions of the license plate mount 14 that can occur in use can be minimized. Thus, a degassed material will exhibit less shrinkage and will have more stable dimensions in use. Avoiding the changes in the length, and the height and particularly the distance between the openings 50 is important to avoid stresses induced through deformation caused by shrinkage of the foam. The following degassing process can be applied to the EPDM prior to cutting out a license plate mount 14:

The sheets of material are placed on suspended racking so that they are not laying on top of each other;
the rack is then placed into a large walk in oven at a temperature of 140 F;
the material is then degassed for an 8 hour period and allowed to rest for 24 hours prior to cutting/converting.

To mount a license plate mount 14 onto a surface the surface should be cleaned by a suitable cleaning fluid such as a fluid containing alcohol or the like substance. Thus, to market a license plate mount 14 according to the present invention a kit containing a license plate mount 14 according to the present invention, a suitable cleaning fluid, a plurality of suitable screws for mounting a license plate, and also a wrench for screwing the screws would be desirable. Advantageously, when using push-lock screws as, for example, included with the fifth embodiment, no tools would be necessary for mounting the license plate.

A license plate mount according to the present invention is advantageous in that it does not require the modification of a vehicle (e.g. drilling holes) for installation, it can include tamper resistant hardware (e.g. security screws) to inhibit theft of the license plate, it can provide extra protection for the bumper, it can reduce the noise associated with rattling of the license plate, and it is easily installed.

All numerical values disclosed herein or in the figures (e.g. dimensions) are provided as examples and should not be understood to be limiting the scope of the present invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A license plate mount arrangement comprising:
   a compliant license plate mount defined by a compliant body having a front surface and a back surface opposite said front surface, said front surface and said back surface terminating at a plurality of edges;
   a non-magnetic pressure sensitive and releasable adhesive residing on said back surface of said compliant body, wherein said pressure sensitive adhesive directly attaches said compliant body to an exterior surface of a vehicle to mechanically support said license plate mount and a license plate supported on said license plate mount on said exterior surface of said vehicle, said adhesive being defined by a plurality of edges;
   a particle guard residing between at least one of said edges of said adhesive and an edge of said compliant body; and
   a plurality of couplings accessible at said front surface and positioned to register with mounting holes of a license plate, wherein said particle guard is a ridge that extends away from said back surface beyond said adhesive, and prevents particles from making contact with said adhesive when said compliant body is attached to said exterior surface of a vehicle.

2. The arrangement of claim 1, further comprising at least another particle guard residing between another edge of said adhesive and another edge of said compliant body, wherein said adhesive resides between said particle guards.

3. The arrangement of claim 2, wherein said another particle guard is a ridge that extends away from said back surface of said license plate mount beyond said adhesive.

4. The arrangement of claim 3, wherein each coupling is moveable relative to said license plate mount.

5. The arrangement of claim 1, wherein said particle guard spans at least the length of said edge of said adhesive.

6. The arrangement of claim 1, wherein said adhesive is configured to have all its edges terminate at a location spaced from edges of said compliant body.

7. The arrangement of claim 1, wherein said compliant body is comprised of EPDM.

8. The arrangement of claim 1, wherein each coupling is received in a respective opening defined in said compliant body.

9. The arrangement of claim 1, wherein said compliant body is a unitary body.

10. The arrangement of claim 1, wherein said compliant body is comprised of a foam-like polymer.

11. The arrangement of claim 1, wherein said compliant body is comprised of a degassed foam material.

12. The arrangement of claim 1, wherein said compliant body is comprised of degassed EPDM.

13. A license plate mount arrangement comprising:
    a compliant license plate mount defined by a compliant body having a front surface and a back surface opposite said front surface, said front surface and said back surface terminating at a plurality of edges;
    a pressure sensitive and releasable adhesive residing on said back surface of said compliant body, wherein said pressure sensitive adhesive directly attaches the compliant body to an exterior surface of a vehicle and mechanically supports said license plate mount and a license plate supported on said license plate mount on said exterior surface of said vehicle, said adhesive being defined by a plurality of edges;
    a particle guard residing between at least one of said edges of said adhesive and an edge of said compliant body; and
    a plurality of couplings accessible at said front surface and positioned to register with mounting holes of a license plate,
    wherein said compliant body is comprised of degassed EPDM.

* * * * *